US009358998B2

(12) United States Patent
Tyson et al.

(10) Patent No.: US 9,358,998 B2
(45) Date of Patent: Jun. 7, 2016

(54) CART FOR WATERCRAFT

(71) Applicant: Sea to Summit Pty Ltd, East Perth (AU)

(72) Inventors: Roland Tyson, East Perth (AU);
Paramjeet Singh, East Perth (AU)

(73) Assignee: Sea to Summit Pty., Ltd., East Perth (AU)

( * ) Notice: Subject to any disclaimer, the term of this patent is extended or adjusted under 35 U.S.C. 154(b) by 0 days.

(21) Appl. No.: 13/899,759

(22) Filed: May 22, 2013

(65) Prior Publication Data

US 2014/0151976 A1     Jun. 5, 2014

Related U.S. Application Data

(63) Continuation of application No. PCT/AU2011/000006, filed on Jan. 5, 2011.

(51) Int. Cl.
  *B62B 1/04*     (2006.01)
  *B63C 13/00*    (2006.01)
  *B62B 5/00*     (2006.01)

(52) U.S. Cl.
  CPC .............. *B62B 5/0083* (2013.01); *B63C 13/00* (2013.01); *B62B 5/0086* (2013.01); *B62B 2202/403* (2013.01)

(58) Field of Classification Search
  CPC .......... B60R 9/10; B60R 9/06; B62B 5/0083; B62B 5/0086; B63C 13/00; B63B 35/7946; B60P 3/10; B60P 3/1033; B60P 3/1066
  USPC ........... 280/42, 43.16, 47.331, 47.131, 47.24, 280/652, 64, 79.6, 63, 646, 28.5, 30, 35, 280/43.15, 46.15, 414.1–414.3; 16/30, 43; 114/344, 347, 381; 301/128; 414/447; 405/7; 248/354.1, 357
  See application file for complete search history.

(56) References Cited

U.S. PATENT DOCUMENTS 2,551,040 A * 5/1951 Newell ...................... 280/47.331
2,598,831 A * 6/1952 Ramey ............................ 280/35
(Continued)

FOREIGN PATENT DOCUMENTS

DE     3147675 A1     6/1983
DE     4232592      *  3/1994  ............. B62K 19/06
(Continued)

OTHER PUBLICATIONS

International Search Report received in PCT/AU2011/000006, dated Mar. 23, 2011.
(Continued)

*Primary Examiner* — Anne Marie Boehler
(74) *Attorney, Agent, or Firm* — Edell, Shapiro & Finnan, LLC

(57) ABSTRACT

A cart is provided for a watercraft including at least two apertures provided therein. the cart includes a transportation portion, and a carrying portion. The carrying portion includes at least two vertical shafts protruding from the transportation portion. The protruding end of each shaft is connected to, or received within, a watercraft engaging portion that tapers off in size as it extends further away from the transportation portion such that at least a section of each watercraft engaging portion deforms and compresses when received within one of the at least two apertures to create frictional engagement between the aperture and the section of the watercraft engaging portion.

13 Claims, 5 Drawing Sheets

(56) References Cited

U.S. PATENT DOCUMENTS

| | | | | |
|---|---|---|---|---|
| 2,622,893 | A | * | 12/1952 | Wasserlein ............... 280/47.331 |
| 3,188,108 | A | * | 6/1965 | Davis ....................... 280/47.331 |
| 3,210,795 | A | * | 10/1965 | Fontana et al. ................... 16/43 |
| 3,768,116 | A | * | 10/1973 | Propst et al. ...................... 16/43 |
| 3,986,723 | A | | 10/1976 | Brockelsby |
| 4,601,481 | A | * | 7/1986 | Maurice .................. 280/47.331 |
| 4,602,802 | A | * | 7/1986 | Morgan ................... 280/47.331 |
| 4,822,065 | A | * | 4/1989 | Enders ..................... 280/47.331 |
| 5,000,468 | A | * | 3/1991 | Weinstein ................. 280/47.34 |
| 5,072,959 | A | * | 12/1991 | Marullo ................... 280/47.331 |
| 5,203,580 | A | * | 4/1993 | Cunningham ........... 280/47.331 |
| 5,390,394 | A | * | 2/1995 | Huang .............................. 16/30 |
| 5,823,551 | A | * | 10/1998 | Conroy ................... 280/47.131 |
| 6,032,964 | A | | 3/2000 | Capobianco |
| 6,142,491 | A | * | 11/2000 | Darling, III ..................... 280/30 |
| 6,142,492 | A | * | 11/2000 | DeLucia ................. 280/47.331 |
| 6,189,900 | B1 | | 2/2001 | MacDonald |
| 6,364,336 | B1 | * | 4/2002 | Jenkins ...................... 280/414.2 |
| 6,588,637 | B2 | * | 7/2003 | Gates .................. A47B 81/005 211/64 |
| 6,824,155 | B1 | | 11/2004 | Heck |
| D508,012 | S | | 8/2005 | Gatwood |
| 6,948,878 | B1 | * | 9/2005 | Smith et al. .................... 403/110 |
| 7,290,690 | B2 | * | 11/2007 | Hancock ................. B63B 25/28 114/343 |
| 2006/0186635 | A1 | * | 8/2006 | Stewart ................ B60P 3/1033 280/414.3 |

FOREIGN PATENT DOCUMENTS

| | | | | |
|---|---|---|---|---|
| EP | 180705 | A1 | 5/1986 | |
| FR | 2537527 | * | 6/1984 | ............... B62B 1/26 |
| GB | 1455598 | * | 11/1976 | ............... B60F 3/00 |

OTHER PUBLICATIONS

Australian Examination Report No. 1, Apr. 3, 2014, 6 pages.
Hobie Cat Forums—Hobie Kayaking/Fishing—Open Forum—Kayaking. Post by Stringy, Posted by Roadrunner, retrieved from the Internet Apr. 2, 2014, 13 pages. http://www.hobiecat.com/forums/viewtopic.php?f=11&1=14028&hilit=cart.

* cited by examiner

CART FOR WATERCRAFT

FIELD

The invention relates to a cart for watercraft. Ideally, the cart is constructed to carry any watercraft having scupper holes provided therein, but primarily sit on top watercraft.

BACKGROUND

The following discussion of the background to the invention is intended to facilitate an understanding of the present invention. However, it should be appreciated that the discussion is not an acknowledgment or admission that any of the material referred to was published, known or part of the common general knowledge in any jurisdiction as at the priority date of the application.

A common recreational water craft allowing users to sit on top of the hull of the watercraft above the waterline, as opposed to inside the hull, is referred to as a sit on top watercraft. Sit on top watercraft employ scupper holes to facilitate drainage of any water entering the cockpit.

Additionally, sit on top watercraft are typically wider and larger than other watercraft and therefore harder to fit on carts meant for narrower canoes and kayaks. This has led to the development of specialised carts for the transportation of sit on top watercraft.

The typical version of such specialised carts employ two vertical shafts attached to a horizontal axle with a wheel at either end. The vertical shafts are inserted in the scupper holes from below and thus keep the boat in place in relation to the horizontal axle and the wheels.

The first problem with such specialised carts is that their vertical shafts need to be inserted in scupper holes from under the watercraft. This makes the process of lifting the watercraft, locating the scupper holes and inserting the vertical shafts of the cart into them while trying to hold the shafts upright and the wheels stationary, extremely awkward and difficult for a single person.

The second problem with such specialised carts is that diameters of scupper holes differ greatly between watercraft of different designs and different manufacturers. This makes it hard for the vertical shafts to snugly fit different types of boats. The use of very thin vertical metal shafts by carts of the prior art leads to the third problem of play and relative movement between the shaft and the scupper hole. To elaborate, when the boat is wheeled over rough ground the repeated impact of the metal shaft on the scupper walls caused by their relative movement can often result in structural damage to scupper walls.

An additional problem faced in respect of carts for sit on top watercraft is that the distance between a pair of scupper holes on either side of the hull again differs greatly between watercraft of different designs and different manufacturers. Some carts of the prior art address this problem by way of modifying the vertical shafts to have a cantilevered profile, the cantilevered vertical section of such shafts are able to pivot about the vertical axis and thereby change the relative distance between the two shaft ends. The problem with this approach is that the vertical shafts, when not at the widest or narrowest setting, are not vertically aligned over the axle between the two wheels. This introduces a bending point in the system. This necessitates use of stronger and heavier material members and joints, which in turn increase the weight of the cart. Additionally, the vertical shafts tend to press asymmetrically against some parts of the wall of the scupper holes aggravating the aforementioned problem of structural damage to the scupper hole walls.

It is therefore the object of the current invention to provide a cart for water craft employing scupper holes, regardless of the distance between, or size of, such scupper holes.

SUMMARY

Throughout this document, unless otherwise indicated to the contrary, the terms "comprising", "consisting of", and the like, are to be construed as non-exhaustive, or in other words, as meaning "including, but not limited to".

In accordance with a first aspect of the invention there is a cart for a watercraft having at least two apertures provided therein, the cart comprising:
 a transportation portion; and
 a carrying portion comprising at least two vertical shafts protruding from the transportation portion,
where the protruding end of each shaft is connected to, or received within, a watercraft engaging portion that tapers off in size as it extends further away from the transportation portion such that at least a section of each watercraft engaging portions deforms and compresses when received within one of the at least two apertures to create frictional engagement between the aperture and the section of the watercraft engaging portion.

The watercraft engaging portion is conical in shape. Preferably, the tapering end of the watercraft engaging portion is elongated. The tapering shape of the watercraft engaging portion may be formed through a plurality of circular ribs.

In its preferred configuration, the watercraft engaging portion is a rubber wedge.

The watercraft engaging portion may be textured to further facilitate frictional engagement between the aperture and the section of the watercraft engaging portion.

The transportation portion comprises at least one wheel connected to opposing ends of an axle of adjustable width. In one configuration, the axle comprises at least two connectors, a portion of one of the at least two connectors sized so as to be received within a portion of another of the at least two connectors. The portion of the at least two connectors sized so as to be received within a portion of another of the at least two connectors may have a measurement scale provided thereon.

In an alternative configuration, the axle comprises three connectors, two of the connectors being of equal size and shape, while a third connector is of such size and shape as allows the third connector to be received within the other two connectors. The third connector may have a measurement scale provided thereon.

Compression lock means may be used to secure the portion of one of the at least two connector sized so as to be received within a portion of another of the at least two connectors and that portion. Furthermore, the portion of the connector not adapted to be received within the portion of another connector may have a slit provided therein to facilitate the compression of that portion and its compressive engagement with the portion of the connector received therein when the compression lock means is in a locked state, The compression lock means can include a lever, where movement of the lever to a closed position causes the compression lock means to move to a locked state where compressive force is applied against the connector to which it is attached, and movement of the lever to an open position causes the compression lock means to move to an open state where the connector to which it is attached is able to move relative to the portion of another of the at least two connectors received therein. Preferably, the lever has a contoured edge of matching profile to an external contour of at least a part of the remainder of the compression lock means such that, when the lever is in a fully closed position, the contoured edge of the lever mates with the external contour.

Each watercraft engaging portion may include a strap retainer and opposite ends of at least one strap are retained at respective strap retainers. In one configuration, the at least one strap is releasably connected together on an end-to-end basis by way of at least one connecting means, each connecting means having a protective cover. The at least one strap may take the form of webbing tape.

BRIEF DESCRIPTION OF THE DRAWINGS

The invention will now be described, by way of example only, with reference to the accompanying drawings, in which.

DETAILED DESCRIPTION

Figure 1:
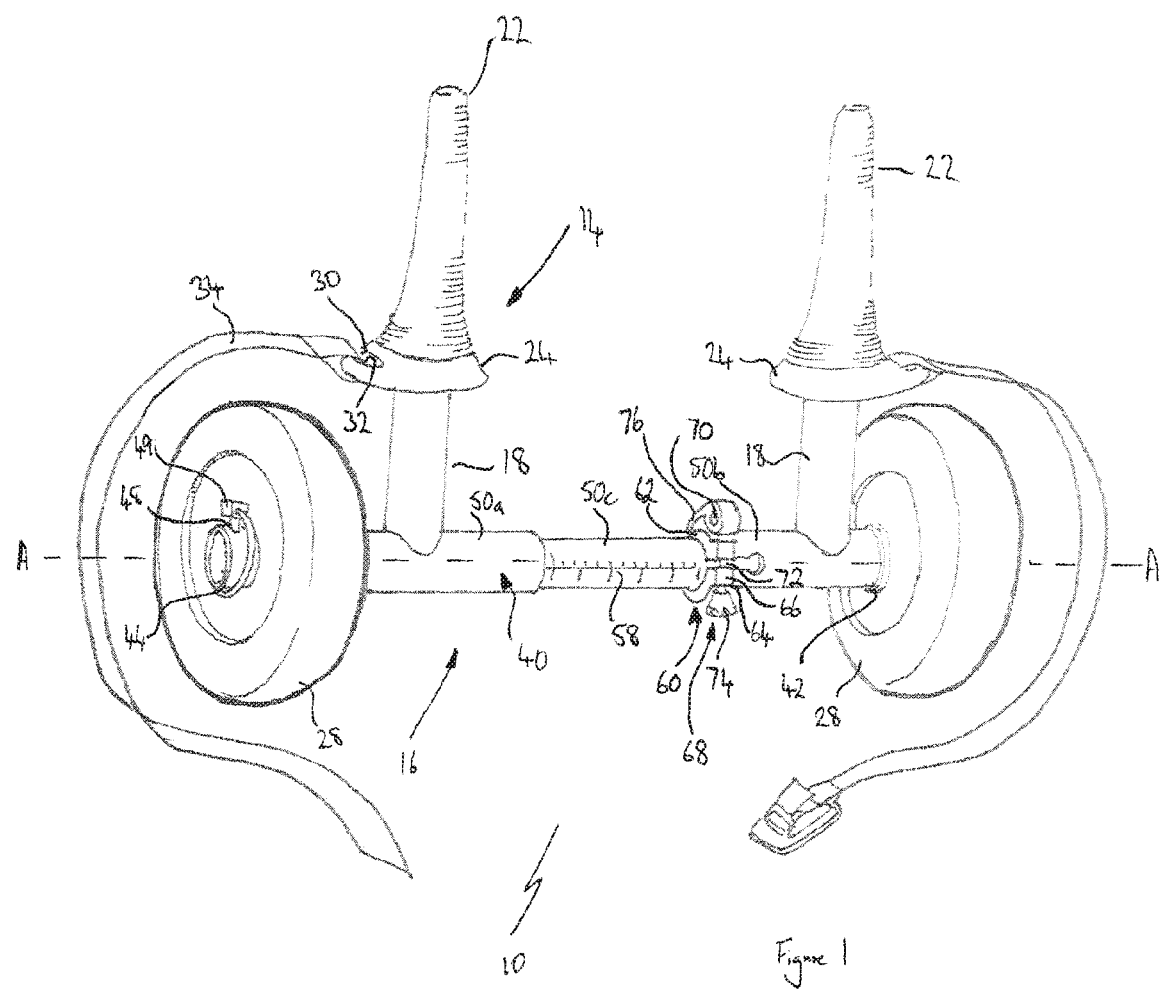
FIG. 1 is an isometric view of a cart for watercraft according to the invention.
Figure 2:
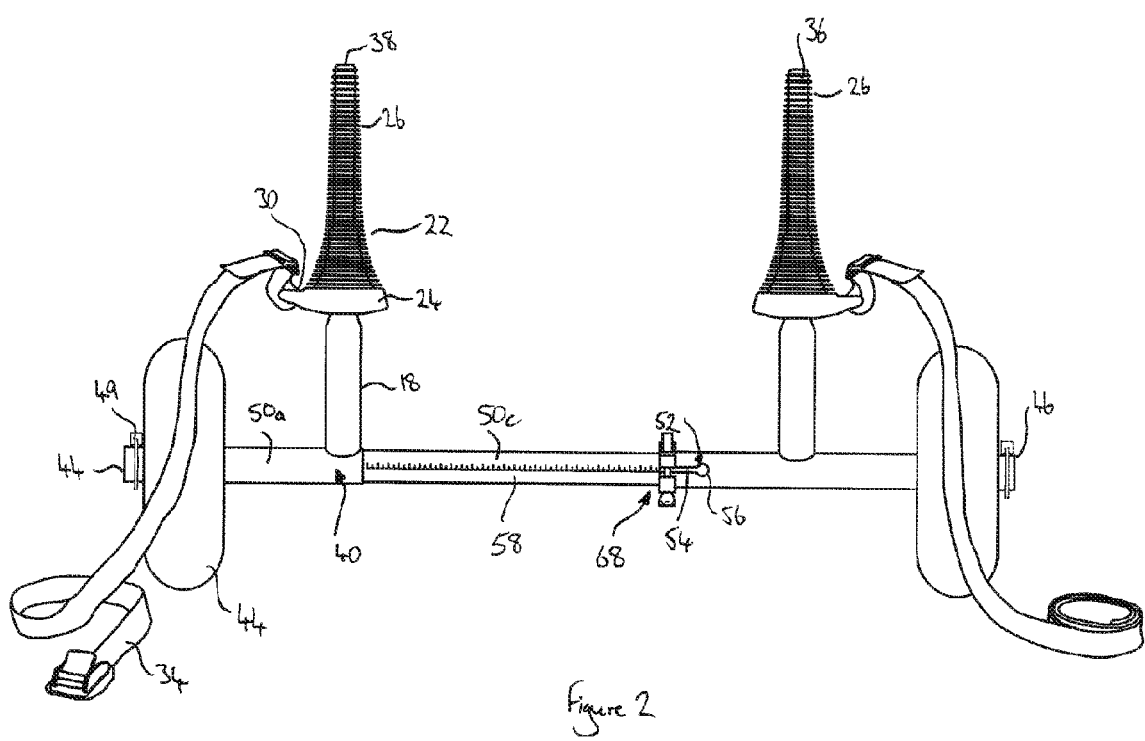
FIG. 2 is a front plan view of a craft for watercraft as shown in FIG. 1.
Figure 3:
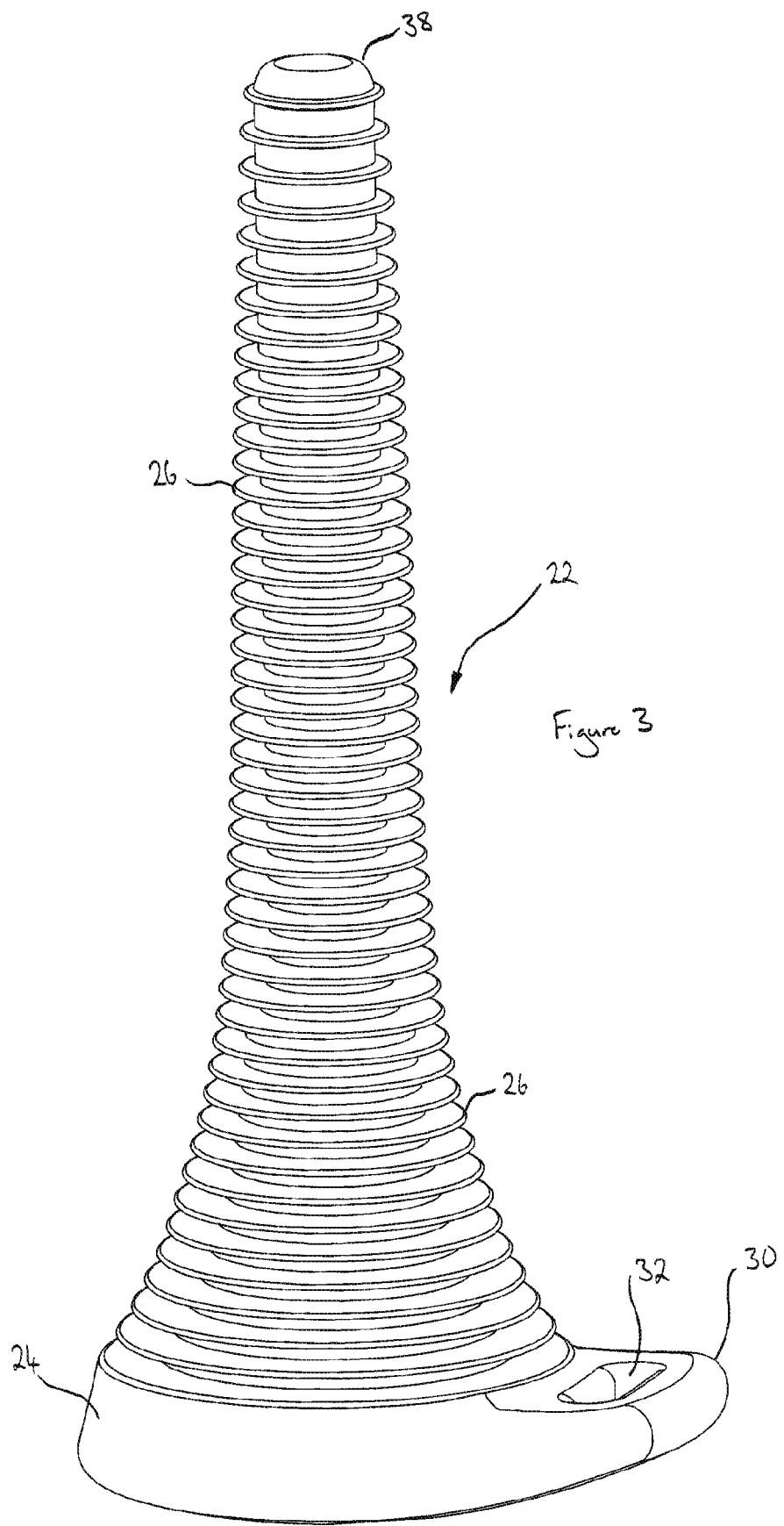
FIG. 3 is an isometric view of a rubber wedge as used in the cart for watercraft shown in FIG. 1.
Figure 4:
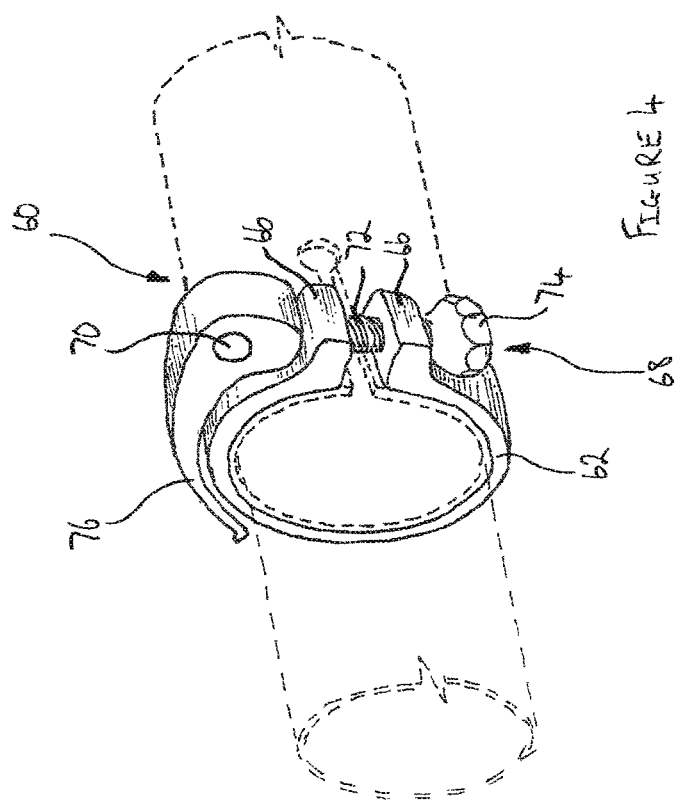
FIG. 4 is an isometric view of a compression lock as used in the cart for watercraft shown in FIG. 1.
Figure 5:
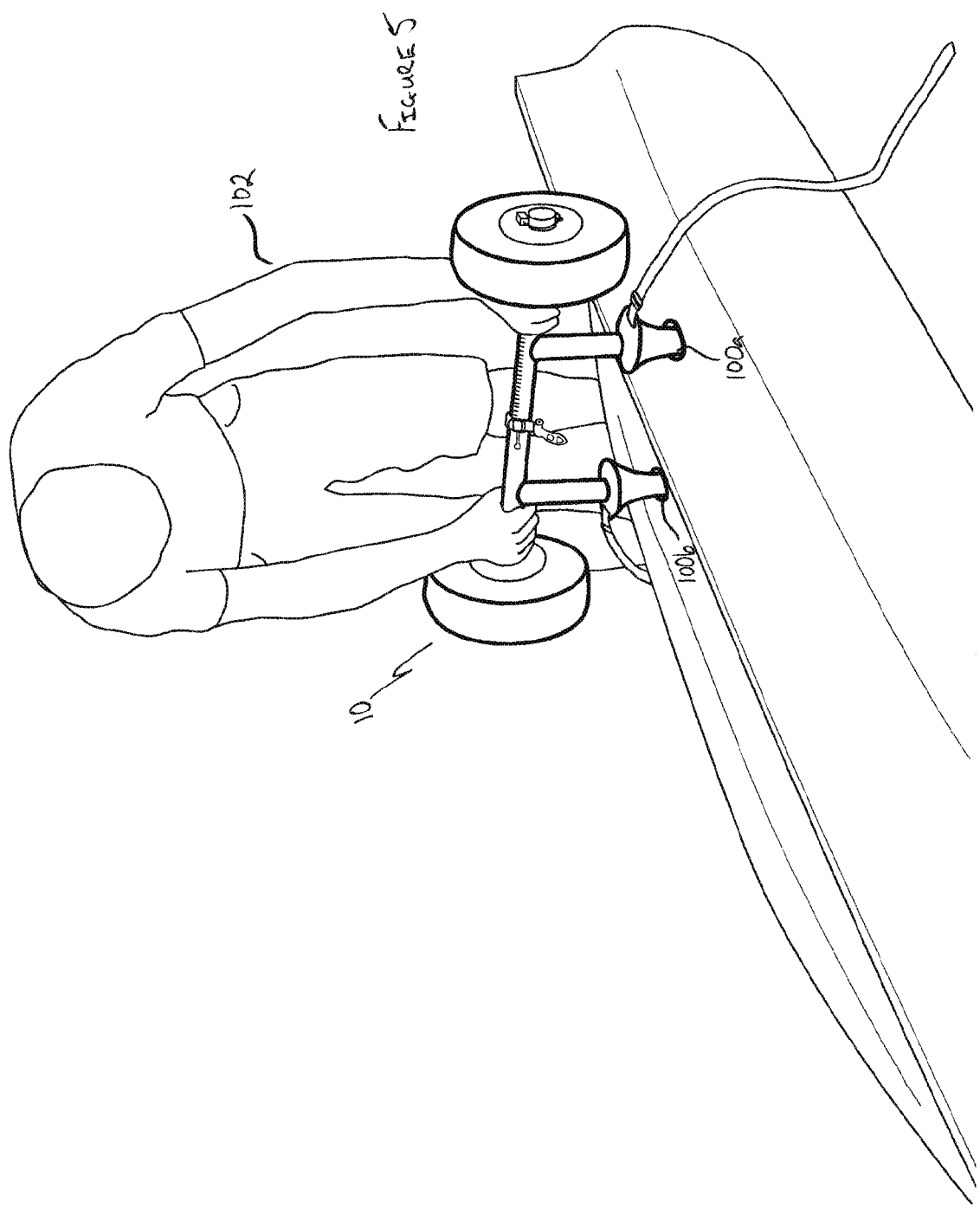
FIG. 5 is a representational view of the cart for watercraft shown in FIG. 1 being inserted into a watercraft.

In accordance with a first embodiment of the invention there is a cart 10 for sit on top watercraft 12. The cart 10 comprises:

carrying portion 14; and
transport portion 16.

The carrying portion 14 comprises two vertical shafts 18. The vertical shafts 18 are spaced from one another along a horizontal axis A. At a first end 20 of each vertical shaft 18 is a rubber wedge 22.

Each rubber wedge 22 is of an elongated conical shape. The elongated conical shape is achieved through a base 24 and a plurality of circular ribs 26.

The base 24 is substantially frustoconical in shape. Extending from the base 24 in a direction towards its nearest wheel 28 is a strap retainer 30. The strap retainer 30 has a slotted aperture 32 provided therein. Woven through the slotted aperture 32 is a webbing tape 34.

The base 24 of each rubber wedge 22 is connected to its respective vertical shaft 18.

Extending away from the base 24 and the vertical shaft 18 is a central core 36. Each circular rib 26 is integrally connected to the central core 36. The diameter of each circular rib 26 decreases in a non-linear manner as it extends further away from the base 24. The end result gives a visual impression of a convex profile at the base 24 leading to a reasonably linear profile at its top.

A flattened cap 38 tops the central core 36.

The transport portion 16 comprises two wheels 28 connected by an adjustable axle 40.

The adjustable axle 40 has a fixed ring wheel retainer 42 spaced from its respective ends 44, 46. The adjustable axle 40 further has a pair of diametrically opposed apertures 48 in each respective end 44, 46. The distance between the wheel retainer 42 and its respective pair of apertures 48 is substantially equal to the width of each wheel 28. In this manner, the adjustable axle 40 retains the wheels 28 in place by abutting each wheel 28 against its respective wheel retainer 42. The wheel 28 is then locked in place by way of spring loaded pins 49, each spring loaded pin 49 positioned so as to be at least partly received within the pair of apertures 48.

The adjustable axle 40 is formed from three hollow cylindrical tubes 50a, 50b, 50c. The first and second cylindrical tubes 50b, 50a are of equal diameter. The third tube 50c is of a diameter that allows it to be firmly retained within both the first and second cylindrical tubes 50b, 50a, while still allowing for horizontal movement along axis A. In this embodiment, the third tube 50c is permanently connected to the second tube 50a.

Positioned at an end of the first tube 50b, opposite the end to which the wheel 28 is retained, is a slit 52. The slit 52 comprises a longitudinal portion 54 which extends along an axis parallel to that of axis A. The longitudinal portion of the slit 52 ends in a circular aperture 56. The role of the slit 52 will be described in more detail below.

The third tube 50c has imprinted thereon a measurement scale 58. The measurement scale 58 provides an indication of the width between the centre points of the rubber wedges 22 in both centimeters and inches.

To securely retain the third tube 50c within the first tube 50b, a compression lock 60 is used. The compression lock 60 comprises a split ring 62. The split ring 62 has two apertures 64 provided in its compression ends 66. The apertures 64 are adapted to receive part of a cam mechanism 68.

The cam mechanism 68 comprises:

a cam head 70;
a threaded bolt 72; and
a nut 74 of opposite threading to the threaded bolt.

The cam head 70 is permanently connected to the threaded bolt 72. Also attached to the cam head 70 is a lever 76. The lever 76 is shaped such that one side thereof has a substantially matching contour to that of the outer surface of the split ring 62.

The threaded bolt 72 is of a size to allow it to be received within both apertures 64 provided in the compression ends 66. The length of the threaded bolt 72 is slightly larger than the width of the split ring 62.

The nut 74 is mated to the threaded bolt 72 at the end not connected to the cam head 70.

The compression lock 60 is received over the top of the first tube 50b. To allow for correct functioning of the compression lock 60, the compression lock 60 must be maintained in a position where a portion of the split ring 62 covers a portion of the slit 52.

The carrying portion 14 is connected to the transport portion 16 by mounting one vertical shaft 18 to each of first tube 50b and second tube 50a. In this embodiment, the mounting position of the vertical shaft 18 on first tube 50b is such that it is on the directly opposing side to slit 52.

The invention will now be described in the context of its intended use.

A sit on top watercraft 12 is turned upside down so that scupper holes 100 on the bottom of the watercraft 12 are easily accessible. The operator 102 of the watercraft 12 then locates one pair of horizontally aligned scupper holes 100a, 100b for use by the cart.

Once chosen, the operator 102 manipulates the cart 10 so as to be placed over the top of the watercraft 12 at a position adjacent the chosen scupper holes 100a, 100b. If the distance between the centre points of the rubber wedges 22 is not substantially the same as the width between the centres of the chosen scupper holes 100a, 100b, the operator 102 must adjust the width of the adjustable axle 40.

To adjust the width of the adjustable axle 40, the operator 102 manipulates the lever 76 from a closed position to an open position. The manipulation of the lever 76 in this manner causes the cam head 70 to rotate in a rotational direction relative to the movement of the lever 76. This provides more give in the threaded bolt 72 and thus slackens the compression applied by the split ring 62 to the first and third tubes 50b, 50c.

With this reduction in compression, the third tube 50c can telescope inwards or outwards relative to the first tube 50b so as to manipulate the distance between the rubber wedges 22. As the third tube 50c extends out from the first tube 50b, the measurement scale 58 becomes visible. The operator 102 can then quickly refer to the measurement scale 58 in determining the appropriate length of third tube 50c to be extended if the distance between the centres of the chosen scupper holes 100a, 100b has already been measured. This can save time rather than visually assessing this distance through trial and error techniques.

Once the appropriate length of third tube 50c has been extended, the operator 102 manipulates the lever 76 from its open position to a closed position. The manipulation of the lever 76 in this manner causes the cam head 70 to rotate in a rotational direction relative to the movement of the lever 76. The off-centre connection between the threaded bolt 72 and the cam head 70 thus causes the threaded bolt 72 to be further pulled through the apertures 64 in the compression ends 66. The result is that a compressive force is once again applied to the first and third tubes 50b, 50c.

The application of compressive force to the first tube 50b causes the slit 52 to narrow. Narrowing of the slit 52 represents a reduction in the diameter of the first tube 50b. This narrowing in diameter also results in a gripping engagement between the first tube 50b and the third tube 50c, thus maintaining the third tube 50c in place relative to the first tube 50b. Accordingly, it is important that at least part of the compression lock 60 cover the slit 52 prior to moving the lever 76 from its open position to a closed position.

If the level of compression force applied by way of the lever 76 alone is not sufficient to securely retain the third tube 50c relative to the first tube 50b, further compressive force can be applied by tightening the nut 74 to the bolt 72 in a manner as would be known to the person skilled in the art.

As a safety feature, the side of the lever 76 having a substantially matching contour to the exterior contour of the split ring 62 faces the split ring 62 when the lever 76 is in a closed position. In this manner, the lever 76 does not protrude outwards unnecessarily and thus be a danger to the operator 10, the equipment or other parties.

With the width of the rubber wedges 22 appropriately adjusted the operator 102 can then insert the rubber wedges 22 into the chosen scupper holes 100a, 100b. The variable diameters of the circular ribs 26 do not cause unnecessary restriction on entry of the rubber wedges 22 into the chosen scupper holes 100a, 100b until a circular rib 26 of larger diameter is inserted. Even then, the ability of the circular ribs 26 to deform about the central core 36 generally allows some of the circular ribs 26 of larger diameter to compress and enter the chosen scupper holes 100a, 100b. These deformed and compressed circular ribs 26 frictionally engage walls of the chosen scupper holes 100a, 100b and thereby securely wedge the cart 10 to the sit on top watercraft 12.

Once the rubber wedges 22 are securely retained within the sit on top watercraft 12 the operator 102 can right the watercraft 12 to its normal operational position. The frictional engagement as described above prevents the cart 10 from coming loose during this operation.

In this manner, the cart 10 of the present invention is advantageous over the prior art. Except in cases where the prior art carts have shafts of substantially equal size to those of the scupper holes into which they are placed, any attempt to connect a prior art cart to the watercraft 12 as described above would see the cart come loose as the watercraft 12 is righted to its normal operating position.

Now in its righted position, the watercraft 12 is elevated at one end due to the presence of the cart 10 underneath it. The operator 102 may then move the watercraft 12 to its desired location by elevating and pulling on the other end of the watercraft 12.

To further secure the watercraft 12 to the cart 10, the operator 102 may slip the webbing tape 34 around the watercraft 12. The webbing tape 34 may be tightened to provide a secure retention of the watercraft 12 in a manner as would be known to the person skilled in the art.

As would be apparent to the person skilled in the art it is most likely that a cart will be used consistently with a single watercraft 12 in most instances. Accordingly, the need to adjust the width of the rubber wedges 22 from one another so as to fit the chosen scupper holes 100 of such watercraft 12 is likely only to be needed on first use.

In accordance with a second embodiment of the invention, where like numerals reference like parts, the carrying portion 14 and transport portion 16 are modified.

The modification sees the omission of the adjustable axle 40 from the transport portion 15. In its place is a box-shaped strut. The wheels 28 are each independently attached to opposing ends of the box-shaped strut. The method of attachment allows for independent rotational movement of the wheels 28.

The modification of the carrying portion 14 sees each vertical shaft 18 comprise of two ends. The first end 20 of each vertical shaft 18 connects to the rubber wedge 22 as described above.

The second end of each vertical shaft 18 terminates in a transverse strut. The combination of the transverse strut and the vertical shaft 18 form a "T"-shape. Each transverse strut is open ended and is of size substantially similar to that of the box-shaped strut. In this manner, the box-shaped strut is able to be received within each transverse strut such that a close fit therebetween is formed.

While the box shape of the strut prevents the rotation of each vertical shaft 18 thereabout, it does not prevent movement of the vertical shafts along the axis A. This thereby provides an alternative means of adjusting the width between the centre points of the respective vertical shafts 18.

To ensure that the desired distance between the widths of the centre points of the respective vertical shafts 18 is maintained, each vertical shaft 18 also has attached thereto a compression lock 60. The compression lock 60 is of identical construction to that described above, except that it is adapted to fit the box shape of the transverse strut rather than the shape of cylindrical tube 50b.

The compression lock 60 also works in the same manner as described above. When the lever 76 is placed in an open position, the vertical shaft 18 to which the compression lock 60 is attached is free to move along axis A. When the lever 76 is placed in a closed position, the compression lock 60 causes the transverse strut to clamp the box-shaped strut and thereby prevent restrict further movement between the two.

It should be appreciated by the person skilled in the art that the above invention is not limited to the embodiment described. In particular, the following modifications and improvements may be made without departing from the scope of the present invention:

While the above description has been provided in respect of a sit on top watercraft 12, the invention may be used with any watercraft 12 that employs scupper holes 100 or other apertures in the watercraft 12. Preferably, the apertures are in the base of the watercraft 12.

The webbing tape 34 may be omitted. Alternatively, other forms of tape or mechanisms for additionally securing the cart 10 to the watercraft 12 may be employed in place of the webbing tape 34.

If the webbing tape 34 is omitted, the base 24 may also be omitted.

The rubber wedges 22 need not be made of rubber, but may be made of any material that allows for deformation and/or compression of the material so as to allow for frictional engagement between the wedge and the chosen scupper holes 100*a*, 100*b*. Similarly, the rubber wedges 22 need not be made of a plurality of circular ribs 26, but may be of a solid construction subject also to the aforementioned constraints.

The rubber wedges 22 may be textured to further increase the level of frictional engagement between the rubber wedge 22 and the chosen scupper hole 100*a*, 100*b*.

The measurement scale 58 may be omitted.

While the adjustable axle 40 is preferably cylindrical, its component parts may have a cross-section of any desired shape.

The adjustable axle 40 may be made from two tubes 50 rather than three. In this situation, at least a part of one tube must be of smaller diameter than the other to allow that tube to telescopically extend relative to the other tube.

The cart 10 may employ more than two wheels. The wheels 28 can be of any type, but preferably are pneumatic.

The vertical shaft 18 may extend so as to be encased by the central core 38. In this arrangement, the vertical shaft 18 may be formed in segments, each segment having a smaller diameter than its lower segment as it extends further upwards away from the adjustable axle 40.

Rubber wedges 22 may be removable.

The rubber wedges 22 may take the shape of any tapering structure, provided that the rubber wedge 22 diminishes in size as it extends further away from the adjustable axle 40.

The method of retaining the wheels to the adjustable axle 40 may vary from the above. As alternative arrangements for securing the wheels would be well known to the person skilled in the art, it will not be discussed further here.

The webbing tape may be one integral part connected by some fastening means or two separate elements connected by fastening means. The fastening means may take the form of clips or a compression buckle, for example. In any case, it is preferable that the fastening means have some form of protective cover to stop the fastening means causing damage to the watercraft.

The invention need not be limited to the compression lock described above to apply compressive force to the respective tubes 50*b*, 50*c*.

While the second embodiment of the invention has been described in the context of a box-shaped strut as the means by which to ensure rotational positioning of the vertical shafts 18 relative to the transport portion 16. However, it should be appreciated that strut used to connect the wheels can have any cross-sectional profile having a straight edged surface to allow for the same restriction.

The vertical shafts 18 may also operate as the central core 36. In such a configuration, each vertical shaft 18 is received within a rubber wedge 22, such that the rubber wedge 22 may abut the transport portion 16.

It should be further appreciated by the person skilled in the art that yet further combinations of elements disclosed above, not being mutually exclusive, may be formed to create further embodiments that fall within the scope of the present invention.

What is claimed:

1. A cart for a watercraft including at least two apertures provided therein, the cart comprising:
    a transportation portion; and
    a carrying portion comprising at least two vertical shafts protruding from the transportation portion, each shaft terminating in a watercraft engaging portion, each watercraft engaging portion comprising a rubber wedge formed around at least a portion of each vertical shaft and a plurality of circular ribs extending from the rubber wedge, at least some of the circular ribs for each watercraft engaging portion decreasing in diameter along the vertical shaft in a direction away from the carrying portion such that each watercraft engaging portion is conical in shape;
    wherein one or more of the circular ribs for each watercraft engaging portion deforms and compresses when received within one of the at least two apertures to create a frictional engagement between the aperture and the section of the watercraft engaging portion.

2. A cart according to claim 1, wherein the transportation portion comprises at least one wheel connected to opposing ends of a strut of fixed width, where each vertical shaft is releasably connected to the strut such that it may be positioned anywhere along its width.

3. A cart according to claim 1, wherein the transportation portion comprises at least one wheel connected to opposing ends of an axle of adjustable width.

4. A cart according to claim 3, wherein the axle comprises at least two connectors, a portion of one of the at least two connectors sized so as to be received within a portion of another of the at least two connectors.

5. A cart according to claim 4, wherein the portion of the at least two connectors sized so as to be received within a portion of another of the at least two connectors has a measurement scale provided thereon.

6. A cart according to claim 4, wherein the axle comprises three connectors, two of the connectors being of equal size and shape, while a third connector is of such size and shape as allows the third connector to be received within the other two connectors.

7. A cart according to claim 6, wherein the third connector has a measurement scale provided thereon.

8. A cart according to claim 4, wherein a compression lock means secures the portion of one of the at least two connectors sized so as to be received within a portion of another of the at least two connectors and that portion.

9. A cart according to claim 8, wherein the portion of the connector not adapted to be received within the portion of another connector has a slit provided therein to facilitate the compression of that portion and its compressive engagement with the portion of the connector received therein when the compression lock means is in a locked state.

10. A cart according to claim 8, wherein the compression lock means includes a lever, where movement of the lever to a closed position causes the compression lock means to move to a locked state where compressive force is applied against the connector to which it is attached, and movement of the lever to an open position causes the compression lock means to move to an open state where the connector to which it is attached is able to move relative to the portion of another of the at least two connectors received therein.

11. A cart according to claim 10, wherein the lever has a contoured edge of matching profile to an external contour of at least a part of the remainder of the compression lock means such that, when the lever is in a fully closed position, the contoured edge of the lever mates with the external contour.

12. A cart according to claim 1, wherein each watercraft engaging portion includes a strap retainer and opposite ends of at least one strap are retained at respective strap retainers.

13. A cart according to claim 12, wherein the at least one strap comprises webbing tape.

* * * * *